(12) United States Patent
Stava et al.

(10) Patent No.: US 7,238,917 B2
(45) Date of Patent: Jul. 3, 2007

(54) DEVICE TO CONTROL POWER SOURCE

(75) Inventors: Elliott K. Stava, Sagamore Hills, OH (US); Keith L. Clark, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 367 days.

(21) Appl. No.: 10/911,135

(22) Filed: Aug. 4, 2004

(65) Prior Publication Data

US 2006/0027545 A1     Feb. 9, 2006

(51) Int. Cl.
*B23K 9/10* (2006.01)

(52) U.S. Cl. .................................. 219/130.21
(58) Field of Classification Search ........... 219/130.21, 219/130.01, 132, 110
See application file for complete search history.

(56) References Cited

U.S. PATENT DOCUMENTS

| | | | | |
|---|---|---|---|---|
| 2,486,165 | A | * | 10/1949 | Journeaux ............... 219/130.21 |
| 3,725,636 | A | * | 4/1973 | Toth ....................... 219/130.01 |
| 4,514,615 | A | * | 4/1985 | Simoneau et al. ..... 219/130.21 |
| 4,672,166 | A | * | 6/1987 | Ladeburg et al. ........... 219/110 |
| 5,117,088 | A | | 5/1992 | Stava |
| 6,548,784 | B2 | | 4/2003 | Sammons et al. |
| 6,570,130 | B1 | * | 5/2003 | Kooken et al. ......... 219/130.21 |
| 6,770,846 | B2 | | 8/2004 | DeCoster et al. |

* cited by examiner

*Primary Examiner*—Clifford C. Shaw
(74) *Attorney, Agent, or Firm*—Fay Sharpe LLP

(57) ABSTRACT

A device to control operation of a power source for an electric arc welder comprising an oscillator for inducing a high frequency voltage into a series circuit including the welding gap, a detector tuned to the high frequency for sensing the level of current in the series circuit at the high frequency and an output circuit to create a start signal when the received signal level exceeds a given value representing a resistance in said gap below a given amount.

105 Claims, 7 Drawing Sheets

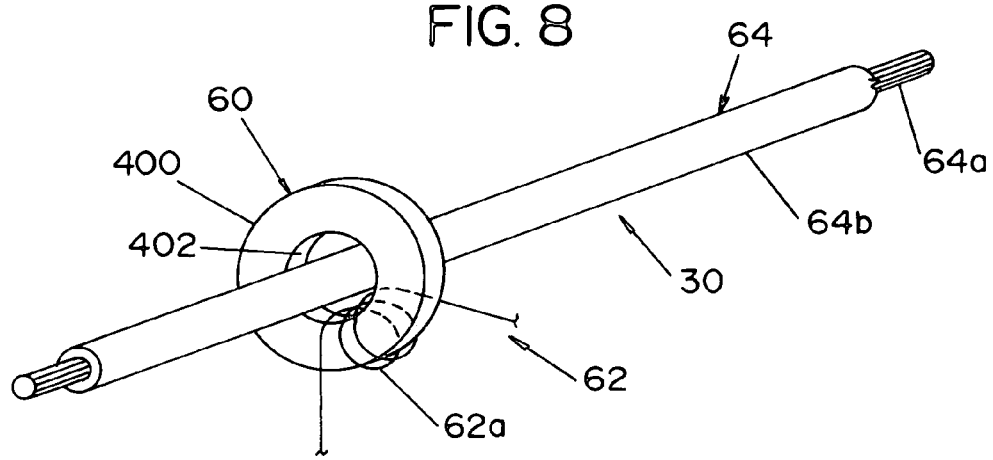
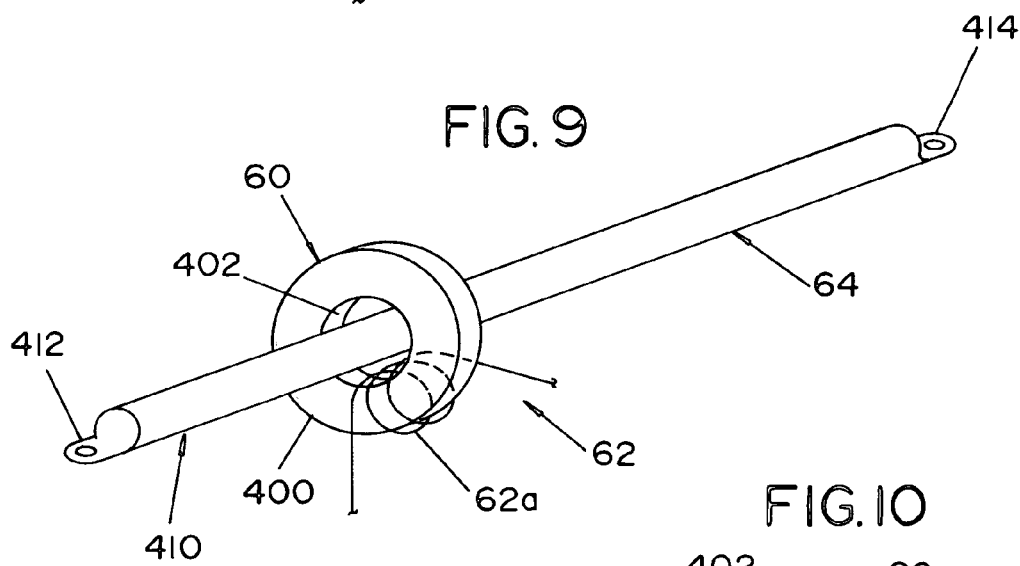
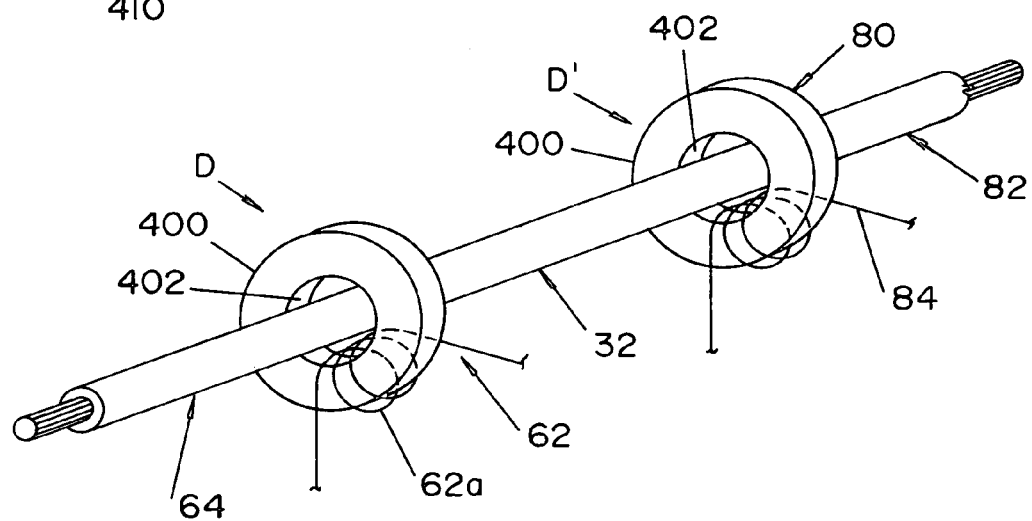

DEVICE TO CONTROL POWER SOURCE

The present invention relates to electric arc welding and more particularly to a device for controlling the operation of a power source for an electric arc welder having a first output terminal connectable to a first welding cable and a second output terminal connectable to a second welding cable where the cables are in a series circuit including a welding gap defined by an electrode and workpiece.

BACKGROUND OF INVENTION

Several techniques have been used to reduce the open circuit voltage of an arc welding power source before the welder is to be used for a welding process. One of the most common designs is a control circuit that reduces the conduction period of the output switching devices, so the open circuit voltage is retained at a desired lower value. In an inverter type power source, the switching devices are usually in the form of a FET or an IGBT. Since the switching frequency is usually greater than 20 kHz, the conduction period of these switching devices is very short and depends upon the operating frequency of the inverter. In order to reduce the open circuit voltage to a low level, the minimum conduction period of the switching devices requires a complicated and electrically demanding control circuit. Power sources employing such OCV control devices also include a circuit to release the control of the power source to allow the welding power to be obtained during welding. Such detection devices with releasing circuits are usually prone to noise and sensitivity problems. Consequently, there is a need for an improved device to control the operation of a power source for an electric arc welder, which device can obtain low open circuit voltage (OCV), except when the welder is actually welding. This device should also be easily retrofitted onto existing power sources used in the electric arc welding industry.

THE PRESENT INVENTION

The shortcomings of prior efforts to reduce the open circuit voltage of a power source used in an electric arc welder are overcome by the present invention. A low voltage, low current, high frequency oscillator, having a known fixed frequency, is used to excite the primary of a small transformer having a secondary that is in the series circuit including the gap between the electrode and workpiece of a welding operation. In this series circuit with the electrode, workpiece and gap there is a second transformer with its primary winding also in series with the gap. The secondary winding of the second transformer produces an AC signal of the fixed frequency due to current flowing through the primary winding of the second transformer and through the gap of the welding operation. The magnitude of the current flowing in the primary winding of the second transformer reflects the impedance or resistance across the gap of the welding operation. Measuring of the high frequency current can be done by either a pass band filter, which is tuned to the same frequency of the high frequency oscillator, or by another circuit tuned to the high frequency of the oscillator of the input transformer. The output of the tuned circuit driven by the secondary of the output transformer is applied to a detector circuit which produces a logic output when the AC high frequency current flowing through the primary winding of the second transformer has a magnitude indicating that the resistance across the gap is at a low value, such as less than about 20 ohms. The tuned detector can be set to generate a logic signal when the resistance of the gap is a low value, such as less than 100 ohms, less than 50 ohms, less than 30 ohms and, preferably less than about 20 ohms. The output of the second or receiving transformer is used to produce a logic signal when there is a low resistance across the gap of the welding operation. This logic signal known as the "start signal" represents a condition where the welder is ready to perform the welding operation. If the welding electrode is not touching the workpiece, the resistance is substantially greater than 100 ohms and the power source of the electric arc welder is not turned on, activated or started. Thus, the device of the present invention starts the power source in the electric arc welder only when the resistance across the gap is below some low set given amount. In accordance with an aspect of the invention, this "start signal" from the device constructed in accordance with the invention is anded with the trigger switch of the welder, so that both a start signal created by the broad aspect of the present invention and a closed trigger are required to turn on the power source. The invention is creation of the "start signal." This signal is used in various logic schemes, such as anding with the condition of the trigger switch. Then the power source can be operated. Until the power source is allowed to operate, the open circuit voltage is at a low level, which in practice is zero voltage. Of course, a low voltage exists to operate the control device of the invention. The device of the present invention creates a start signal, which signal is anded with a signal from the trigger switch to produce an "enable signal" that operates the power source so it directs full power to the welder.

In accordance with another aspect of the invention, the anded output or enable signal, explained above, is ORed with an input having a logic 1 when the welding current exceeds a minimum value. Thus, the power source is allowed to operate at full power when there is a welding current flowing that exceeds a given set amount (the welding current signal) or when the trigger switch is closed and the electrode is moved against the workpiece to create a "start signal." Consequently, at the beginning of the welding operation, a first or primary status controls the operation of the power source. The trigger is closed and the electrode is moved toward the workpiece to a position where the gap resistance is below a given amount. This is the beginning of the welding operation. The invention is broadly creating a "start signal." Then the "start signal" is anded with the trigger switch to create an "enable signal." This starts the power source. After the welding operation commences, a welding current exists, which has a value greater than a set low average current level. This condition or status indicates that a welding operation is in progress so that the power source will remain at a full power. The sensed welding current is averaged to produce the "welding current signal" so that there is no interruption as the welding process proceeds. Consequently, after the welding is started, the power source remains at full power until the start signal is removed and the trigger switch is opened or there is no welding current. A start of a new weld cycle, manually or mechanically, activates the device constructed in accordance with the invention and awaits a "start signal" indicative of a low resistance across the gap between the electrode and workpiece.

The logic output of the detector of the present invention is the start signal that is combined with the welding trigger switch signal and possibly other conditions to generate a "starting signal" that inhibits power source output until a low resistance occurs across the welding gap. Thus, the total operation of the switching devices in the inverter are inhibited or turned off until there is a sensed low resistance across the gap and the trigger switch is closed. No power is available from the power source, which condition is defined as a low or zero open circuit voltage (OCV). The only voltage applied between the electrode and workpiece is the low voltage, low current, high frequency signal generated and applied to the monitored series circuit including the two welding cables and the welding gap. This new control device is free of noise and other spurious signals. The high frequency used in the input signal is not a multiple of either 50 Hz or 60 Hz. Consequently, there is an additional noise immunity when the monitoring signal is applied to the series circuit, including the gap of the welding operation. The logic signal used to inhibit the output operation of the power source does not necessarily need to completely turn off the power source; therefore, the logic signal can reduce the output of the power source to a desired open circuit voltage. In practice, the open circuit voltage is zero so that there is no energy created by the power source. The low resistance between the electrode and work needed to activate the detector feature of the present invention is drastically less than 200 ohms and indeed about 20–30 ohms. When the detector device of the present invention detects a short circuit or a low resistance across the gap, the power source is released to provide the full output capabilities of the power source. It is anticipated that the present invention is formed as a part of the power source; however, the device of the present invention can be separately produced and attached to the external circuit of the welder so that the existing arc welding power source can be fitted with the present invention.

In accordance with the present invention there is provided a device to control the operation of a power source for an electric arc welder. The power source has a first output terminal connectable to a first welding cable and a second output terminal connectable to a second welding cable. These cables are in a series circuit including a welding gap defined by an electrode and workpiece. The device comprises an oscillator having a first winding for inducing the high frequency voltage into the series circuit, a detector tuned to the high frequency to sense the level of current in the series circuit at the set high frequency and an output circuit to create the "start signal" when the level of current exceeds a given value representing a resistance in the welding gap below a given amount. In accordance with the preferred embodiment of the present invention, the first winding is the primary of an input transformer where one welding cable is the secondary winding of the input transformer. The detector is an output transformer with a primary winding comprising one of the welding cables and a secondary winding in a circuit tuned to the high frequency. Thus, the input transformer and output transformer involve a single turn winding defined by the welding cables and a multiple turn winding driven by the oscillator and received by the detector circuit. A single turn winding formed by the welding cable has a low resistance and carries high current as used in welding. In this manner, the welding cables receive a high frequency monitoring voltage and detect the level of this voltage in a manner representing the amount of resistance across the welding gap.

The invention is creation of a "start signal" when the impedance across the welding gap is below a given amount, such as about 20–30 ohms. This start signal is used in many logic networks. For instance, if the "start signal" is produced by a first transformer inducing a fixed frequency into (a) a series circuit including the welding gap or (b) a series circuit that is to be completed before the power source is to be turned on, and a receiving transformer, the start signal may cease to exist if the transformers are saturated by the welding current. In this instance, which is the preferred embodiment, the logic network includes an override section to give a power supply on signal when the average welding current flows indicating a welding operation. This does not change the invention, but is the preferred use of the broadest aspect of the invention.

In accordance with another aspect of the invention, the set frequency used in monitoring the resistance across the gap is greater than 50 kHz. The detected signal represents a resistance less than 100 ohms, less than 50 ohms, or less than 30 ohms. In practice, the low resistance necessary to activate the tuned detector of the present invention is less than 30 ohms and approximately 20 ohms. The "start signal" created by the present invention is used in various logic circuits to cause full power operation of the power source when such power is desired. One of the logic circuits involves the sensing of the average current across the gap. This is the welding current signal. The power source remains active and at full power whenever there is a welding operation being performed as indicated by the welding current signal. During such welding operation, there is no need to have zero open circuit voltage or a low open circuit voltage as is required at the start of the welding operation.

In accordance with still a further aspect of the invention, the primary winding of the input transformer and the secondary winding of the output transformer are coupled by a capacitor in a circuit between the welding cables. The capacitor blocks low frequency and DC current between the cables. The input transformer induces a high frequency signal in the series circuit including the gap. The output transformer of the detector portion of the invention detects the magnitude of the high frequency current flowing across the gap. This magnitude exceeds a given level when the resistance across the gap is below the set given amount. In practice this amount is about 20–30 ohms.

In accordance with another aspect of the present invention there is provided a device to prevent the operation of a power source for an electric arc welder, which power source has a first output terminal connectable to a first welding cable and a second output terminal connectable to a second welding cable. The cables are used in a series circuit including a welding gap defined by an electrode and workpiece. The device comprises an oscillator to apply a high frequency, low voltage signal, low current to the series circuit. A detector tuned to the high frequency creates a "start signal" when the high frequency voltage reaches a value indicative of a resistance across the gap being below a given amount. This given amount is generally less than 50 ohms.

In accordance with still a further aspect of the invention, there is provided a method of enabling the starting of a power source of an electric arc welder used to weld across the gap between an electrode and workpiece. The method comprises applying a high frequency voltage in a series circuit including the gap; measuring the magnitude of the high frequency voltage in the series circuit; and, enabling the power supply when the magnitude is greater than a given level indicative of a resistance in the gap below a given amount.

Another aspect of the invention is the provision of an improvement in an inverter type power source. This improvement includes a device, as defined above, to prevent operation of the power source of an electric arc welder. This monitoring device is used to prevent operation of the inverter whenever a high voltage series circuit is open to receive inadvertently the full open circuit voltage of the power source. When the invention is described as turning on the power source, this can be done internally of the power source or at the input connector to the power lines to the power source. These two features are defined as turning the power source on or allowing the power source to be full on.

The present invention involves two transformers that are connected such that the secondary of the first transformer is in series with the primary of the second transformer. They are both in series with the output of the welding circuit. The primary of the first transformer is excited with a known, fixed frequency by an oscillator. The secondary of the second transformer reflects the fixed frequency signal, which signal is applied to a circuit turned to the fixed frequency. The magnitude of the current of the secondary of the second transformer is proportional to the welding gap resistance. The "tuned circuit" responds or produces "start signal" only from signals close to the fixed frequency. Other frequencies from extraneous signal sources, such as 50/60 Hz power lines, inverter operating signals, etc. are all rejected by the tuned circuit. The magnitude of the output signal from the "tuned circuit" is a function of the magnitude of its input signal. If it is greater than a given value, a "start signal" is produced. This start signal is used in a variety of logic networks.

The primary object of the present invention is the provision of a device for preventing operation of a power source (internally or externally) until the resistance across the gap between the electrode and workpiece is below a given amount.

Yet another object of the present invention is the provision of a device, as defined above, which device involves inducing a high frequency signal into the series circuit including the welding gap and detecting or receiving the high frequency signal in the series circuit by a tuned circuit so the magnitude of the received signal is indicative of an acceptable low impedance. When the magnitude of the signal increases due to low impedance, the tuned detector is activated creating a "start signal" allowing operation of the power source.

Still a further object of the present invention is the provision of a method of using the impedance monitoring device, as defined above.

Another object of the present invention is the use of a device defined above in an inverter type power source and its use to monitor any high voltage series circuit which should not be fully powered unless essentially closed.

These and other objects and advantages will become apparent from the following description, taken together with the accompanying drawings.

PREFERRED EMBODIMENT

Figure 1:
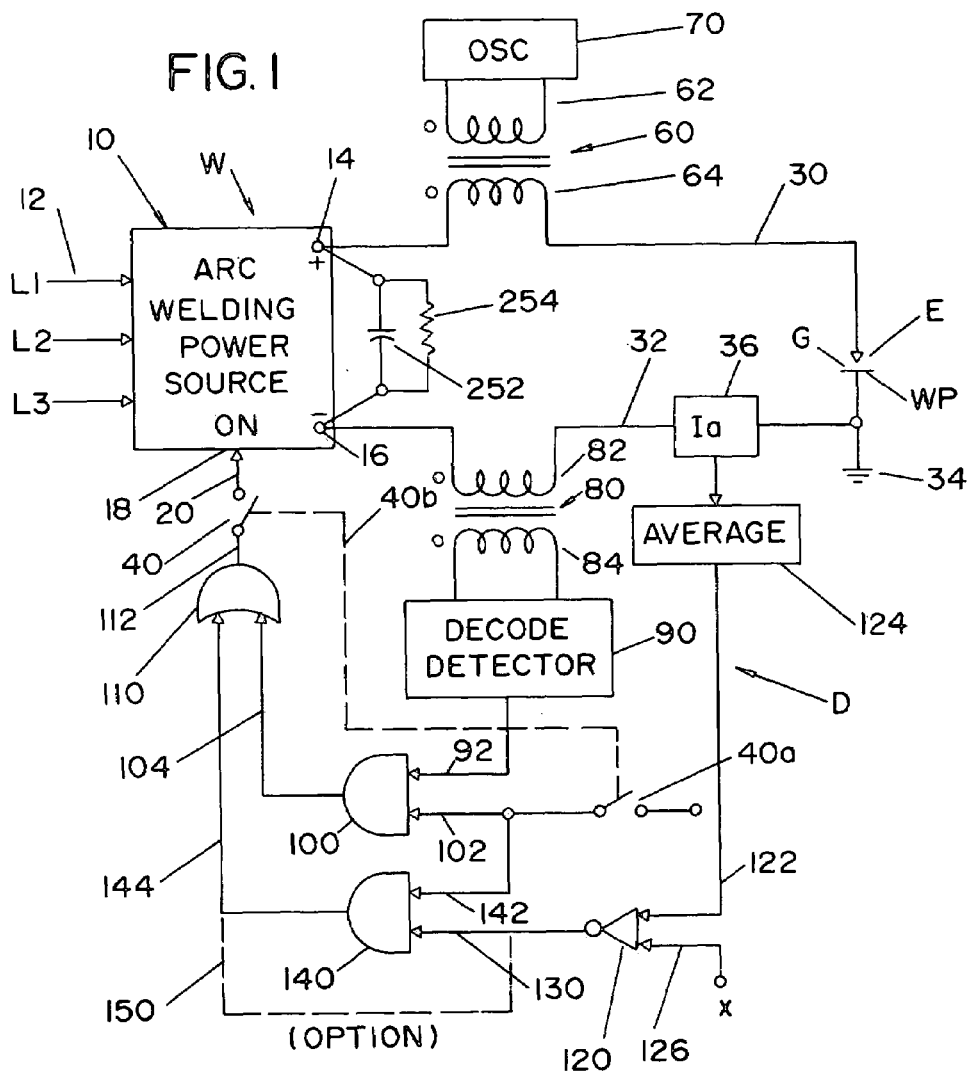
FIG. 1 is a wiring diagram including a power source start circuit using the preferred embodiment of the present invention.

Referring to the drawings, wherein the showings are for the purpose of illustrating preferred embodiments of the invention only and not for the purposes of limiting same, FIG. 1 shows an electric arc welder W of the type used for AC or DC welding for MIG welding, TIG welding, stick welding and submerged arc welding in both CC and CV modes. Welder W includes power source 10 having a three phase input 12 and output terminals 14, 16 connected to welding cables 30, 32, respectively. The welding operation is schematically illustrated as an electrode E, which can be a consumable wire directed toward workpiece WP connected to ground terminal 34. Gap G is located between electrode E and workpiece WP and is used in standard welding technology. The average welding current is measured by shunt 36. When welding is performed by welder W, power source 10 is activated to provide power at terminals 14, 16. Power source 10 is preferably an inverter based power source having an ON terminal 18 controlled by the logic on input line 20. A logic one or starting signal on line 20 activates power source 10 to provide welding power at terminals 14, 16. A logic zero on line 20 (no starting signal) turns power source 10 off or down to a very low open circuit voltage. Power source 10, when activated, has an open circuit voltage across terminals 14, 16 which is high. When the power source is deactivated by a logic zero on line 20, the open circuit voltage of power source 10 is zero. To turn the power source fully on, switch 40 or a contact from the trigger of the welding gun is closed in accordance with standard technology. The present invention relates to the concept of maintaining the power source at zero open circuit voltage until switch 40 is closed and there is a low resistance across gap G. This low resistance indicates that the welder is in a condition preparatory to beginning the welding operation. A resistance across gap G greater than the set given amount indicates that the gap is still open and there is a demand for no open circuit voltage or a low OCV. An open circuit voltage is not required or desired in a welding operation until the welding process is to be initiated. This condition of the gap is recognized as a low resistance across gap G. Indeed, the resistance is often zero by electrode E touching workpiece WP to start the welding process. The invention involves maintaining the open circuit voltage of the power source 10 at zero or a low level (which is equivalent to zero) until there is a detected indication that a welding operation is being initiated. This event is accomplished by determining the resistance across gap G. This is the broadest aspect of the invention. A more specific use of the invention is creating "an enable signal" when (a) the welding operation is initiated by a low resistance in gap G (creating a "start signal") and (b) trigger switch 40 is closed.

The closing of switch 40 is a positive act after or when the electrode approaches or contacts workpiece WP. Power source control device D is used to reduce the open circuit voltage of power source 10 until the resistance in gap G is below a given amount, which given amount is generally less than 100 ohms, 50 ohms, or 30 ohms according to the desired setting of device D. In practice, power source 10 is not operative to provide open circuit voltage until the resistance across gap G is less than 30 ohms and preferably less than 20 ohms. To practice the broadest aspect of the invention, device D includes an input transformer 60 having a primary winding 62 and a secondary winding 64. Winding 64 is a single turn of cable 30, which cable is passed through a tube. About the tube is a toroid with three turns wound upon it, which constitutes the primary winding 62. The tube as defined above could be a conductor such as copper or aluminum so that cable 30 electronically terminates at both ends of the tube. These transformer structures used in the present invention are described in detail in FIGS. 8–10. This is known transformer technology, where one turn is a low resistance strap. Primary winding 62 is energized at a high frequency by a low voltage signal created by oscillator 70. The set frequency is generally greater than 50 kHz and preferably in the range of 60–90 kHz. In practice, oscillator 70 is set at 85 kHz. The current of this signal is limited to a low value. In the preferred embodiment the signal current is less than 40 ma. Input transformer 60 induces a high frequency low voltage signal into the series circuit comprising cable 30, electrode E, gap G, workpiece WP, shunt 36, cable 32 and the internal resistance and inductance between terminals 14, 16 of power source 10. Consequently, a high frequency signal is induced into this series circuit. The obtainable magnitude of this signal is determined by the resistance in gap G. This magnitude is sensed by output transformer 80 having a primary winding 82 and a secondary winding 84. Winding 82 is a single turn winding such as secondary winding 64 of input transformer 60. The high frequency signal induced into secondary winding 84 is directed to the tuned decoding detector 90 which detector is constructed in accordance with standard technology to provide a logic signal on output 92 when the resistance of gap G is below a given amount. In practice this amount is about 20–30 ohms. Consequently, a logic 1 on output start signal line 92 indicates that electrode E is touching workpiece WP preparatory to and beginning a welding operation. Creation of a "start signal" in line 92 is the broadest aspect of the invention. A "start signal" in line 92 is created when gap G has a resistance less than a given amount. To accomplish this objective, there is an input transformer inducing a high frequency low voltage signal in the series circuit including gap G. Output transformer 80 detects and measures the magnitude of the signal at the set frequency. The magnitude of any signal at the set high frequency is measured by detector 90 and creates an output logic one or "start signal" on line 92. How this start signal of the present invention is used to start power source 10 is another aspect of the invention. The broad concept as described can be used with diverse starting logic for power source 10.

In the preferred embodiment of the invention, power source control device D utilizes a "start signal" on line 92. This signal is used to control power source 10. In the preferred embodiment the novel "start signal" is one input of an anding circuit 100 having a second input 102 from contact 40a of the trigger switch. The term contact or switch will be used interchangeably for items 40 and 40a. Contacts 40 and 40a are the trigger switch contacts which are closed when a welding operation is initiated by an operator or by an automatic mechanism. In the preferred embodiment of the invention, device D includes only contact 40a; however, for reasons to be explained later, the other contact 40 is also illustrated to show that power source 10 is not operated until there is a low resistance at gap G and the trigger is closed to initiate the welding operation. Anding circuit 100 has output 104 for an "enabling signal" that is a logic one when the power source 10 is to be fully on. This enable signal does not occur unless the trigger switch 40a is closed. Thus, contact 40 is closed by means 40b to connect line 20. Output 104 of anding circuit 100 is directed to starting circuit 110 in the form of an OR gate with one input being the "enabling signal" on line 104. Thus, when line 104 is a logic one, output 112 of starting circuit 110 is a logic one. This starts power source 10 so it is at full power, i.e. welding power. With switch 40a closed, switch 40 is also closed. In most welder power sources, there is an internal low impedance branch between terminals 14, 16 as represented by the parallel circuit of capacitor 252 and resistor 254. If device D is retrofitted on a power source without a low impedance between its output terminal, such circuit is added so the series circuit with gap G has a low impedance.

Switch 40 in line 20 can be eliminated in practicing the invention. However, it is used with an override network involving a welding current detector. After a "start signal" in line 92, the welding cycle commences and welding current flows. As long as there is welding current, the power source should stay at the full on state. The full on state means it has a welding power which may be low, such as with TIG welding. In the preferred embodiment of the invention, when the welding current flows, transformers 60, 80 saturate and become ineffective to maintain a logic one on line 92. There is no "start signal" after the device D has accomplished its objective at the start of a welding cycle. To hold the power source on after the transformers saturate, the logic network includes an override segment in the form of comparator 120. The voltage or input signal on line 122 is provided by welding current averaging circuit 124. Consequently, the voltage on line 122 is representative of the average welding current of welder W. This average welding current is compared by detector 120 with the voltage on a second input 126. This input has a voltage representing a low reference current x. By this logic network, when the average welding current represented by the voltage on line 122 is greater than a certain fixed lower amount, (and the transformers are saturated) comparator or welding current detector 120 produces a logic one on output line 130 which is a "welding current signal." The welding current signal on line 130 can be used in two separate branches of device D. The first and preferred branch directs the welding current signal on line 130 to AND gate 140 having an input 142 represented by a logic one upon closing of trigger switch 40a. This action releases gate 140 for operation in accordance with the logic on input line 130. Thus, the logic on line 144 is a "welding current signal" appearing when there is a welding current of at least a small amount. In this branch of the welding current signal processor feature used in device D, the logic on line 144 is enabled only when trigger switch contact 40a is closed. In an alternative, optional operation, as illustrated by dashed line 150, the logic on line 144 merely reflects the logic on line 130. When a logic one appears on line 144 there is a welding current above a given small amount. When this occurs, starting circuit 110 is activated to produce a starting signal or logic on line 112. In this optional operation, when there is a welding current and the trigger switch is closed, switch 40 is closed and the power source is on. When the welding operation is stopped, trigger switch contact 40 is opened. Power source 10 is deactivated to a zero open circuit voltage awaiting the next starting operation implemented and controlled through device D. As can be seen, trigger switch 40 may be eliminated and is used primarily when the device D generates a welding current signal bypassing the remainder of the circuitry of device D. So whenever there is welding current and/or the transformers are saturated, the power source is still held on. As can be appreciated from FIG. 1, device D turns on power source 10 when the resistance across gap G is below a given amount. This is the basic concept of the present invention which is accomplished by inducing a high frequency, low voltage signal in a series circuit including the gap and measuring the magnitude of the signal by a tune detector to create a start signal in line 92. Otherwise, the power source remains off with a zero open circuit voltage. It is possible to use transformers that do not saturate, then the novel start signal will be held during welding and there is no need for the override portion of the logic network. The invention is the creation of the start signal at the start of a weld cycle and the use of this signal is multipurpose.

Figure 3A:
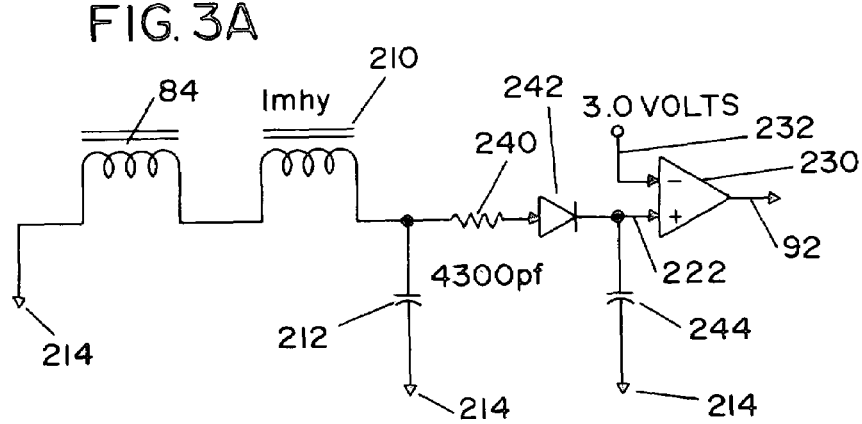
FIG. 3A is a more detailed wiring diagram of the tuned circuit shown in FIG. 3 and as now used in the practical implementation of the invention illustrated in FIG. 1.
Figure 2:
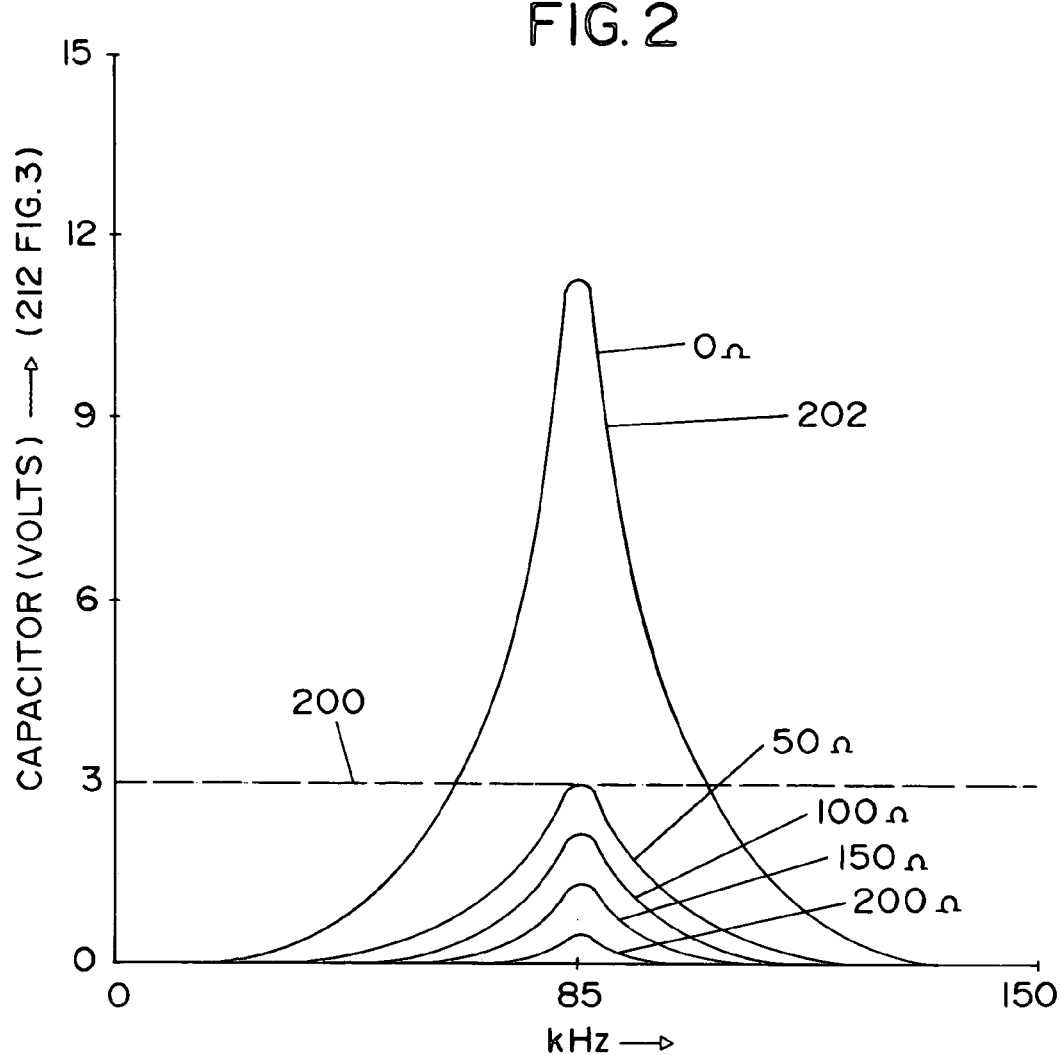
FIG. 2 is a graph illustrating the detected signal used by the circuit shown in FIG. 1 and associated with various resistances across the welding gap.
Figure 3:
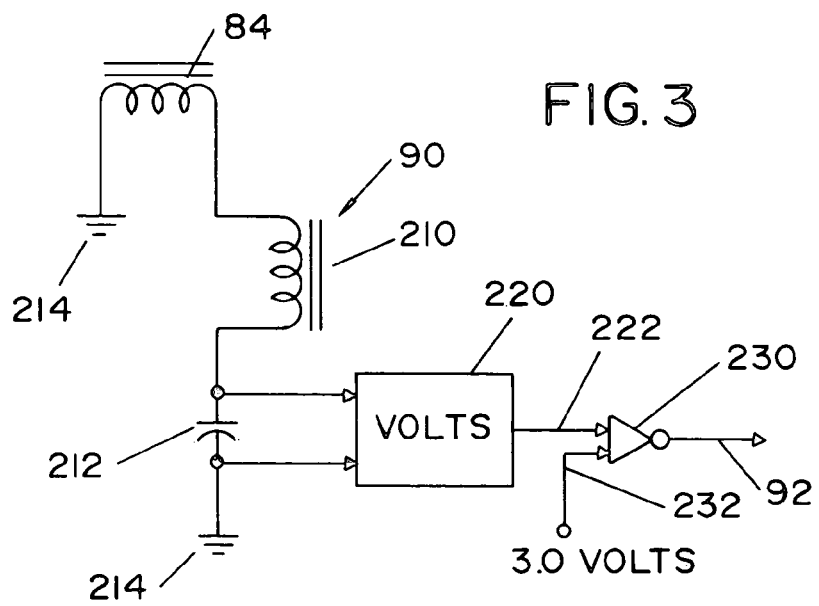
FIG. 3 is a wiring diagram of a tuned circuit used in the detector portion of the embodiment of the invention illustrated in FIG. 1.
Figure 3B:
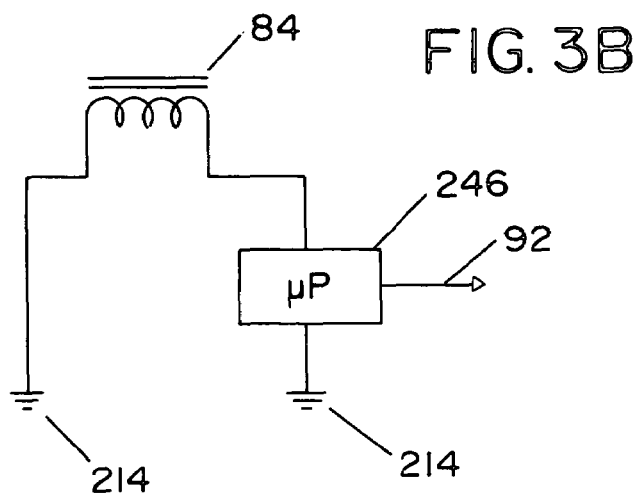
FIG. 3B is another tuned circuit for use in detecting a received signal created by the present invention.

The graph shown in FIG. 2 represents the response of detector 90 for different resistances of gap G. A response curve at 85 kHz is schematically illustrated for 200 ohms, 150 ohms, 100 ohms, 50 ohms and 0 ohms. By selecting a detect capacitor voltage of 3.0 volts, the set amount of impedance needed for creation of the start signal in line 92 is represented by dashed horizontal line 200. A response curve for detector 90 which has the magnitude of curve 202 for 0 ohms will generate a start signal in line 92. At higher resistances, the response curves at 85 kHz are below set level 200 so detector 90 does not initiate a start signal in line 92. Device D has certain built-in redundancies. If oscillator 70 fails, then there is no output curve and detector 90 does not exceed the set voltage level of line 200. If the detector 90 loses its tuned frequency, there is no response curve and no detected curve extending above the voltage level of line 200. Consequently, there are layers of redundancy utilizing the input transformer and output transformer of device D. These transformers are tuned to a specific high frequency, greater than 50 kHz, and preferably in the range of 60–90 kHz. In practice, the tuned frequency is 85 kHz. A variety of circuits can be used for reading the received signals as shown in FIG. 2. A simple tuned circuit used for detector 90 is shown in FIG. 3. Detector 90 reads the signal induced on secondary winding 84 by providing inductor 210 and capacitor 212 connected to ground terminal 214 and tuned to the set frequency of oscillator 70. A tank circuit including winding 84 is formed by connecting ground terminals 214. Thus, voltage sensing circuit 220 detects the voltage across capacitor 212. This voltage represents the magnitude of the received signal at 85 kHz and is the ordinate of the graph shown in FIG. 2. Circuit 220 reads the voltage across capacitor 212 and outputs this voltage on line 222 directed to the input of comparator 230 having a second input 232 set to detect a signal greater than 3.0 volts. Thus, if the received signal creates a voltage greater than 3.0 volts on capacitor 212, a start signal is created on line 92. This is the illustrated embodiment of the invention shown in FIG. 2. The output of comparator 230 is the "start signal" on line 92. This tuned detector circuit is disclosed in more detail in FIG. 3A. The value of inductor 210 and capacitor 212 are given to produce a tuned frequency of generally 85 kHz. In practice, the detector includes a demodulator circuit for tuned detector circuit 90. This circuit employs resistor 240, diode 242 and capacitor 244 in parallel with capacitor 212. The voltage on capacitor 244 is essentially the voltage on capacitor 212 and is the input 222 of comparator 230. Other circuits could be used for creating a signal in line 92 indicative of a resistance across gap G being below a given set amount. Another tuned circuit is shown in FIG. 3B when secondary 84 is directed to microprocessor 246 having a tuned response program to create a signal in line 92 when the high frequency signal received by secondary winding 84 has a magnitude indicating a low resistance across gap G.

Figure 4:
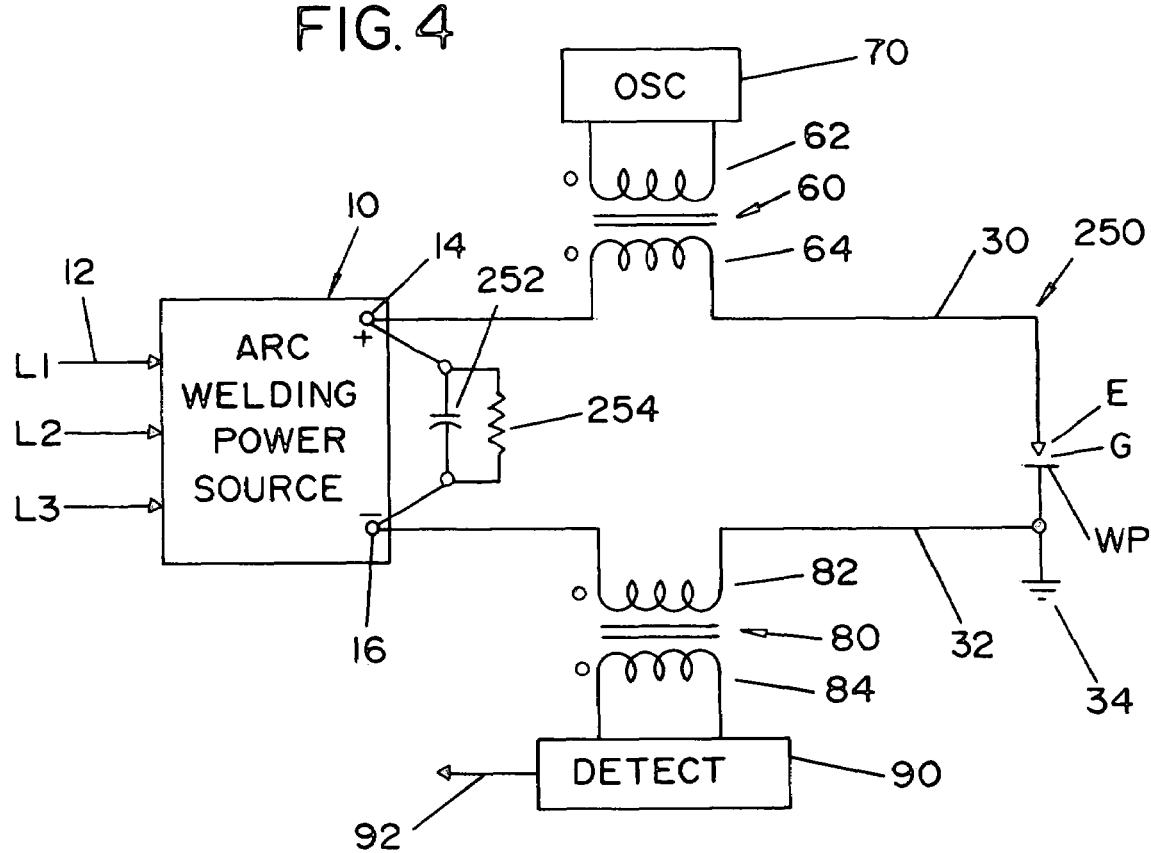
FIG. 4 is a simplified schematic diagram illustrating the broad aspect of the present invention together with a modification of the transformers used in practicing the invention.

To illustrate the broadest aspect of the present invention, the use of an input transformer 60 and output transformer 80 is schematically illustrated in FIG. 4 wherein the detector series circuit 250 is completed through power source 10 by the internal capacitor 252 in parallel to internal resistor 254. Transformer 60 induces a high frequency low voltage, in the neighborhood of 10 volts, signal on circuit 250. The impedance or resistance across gap G determines the magnitude of the induced high frequency signal which is received by output transformer 80 used as tuned detector 90. This transmitter and receiver creates the novel start signal in line 92 when the resistance of gap G of series circuit 250 is below a given set amount, such as 30 ohms. The location of transformers 60, 80 in circuit 250 is somewhat irrelevant to the ability for measuring the resistance at gap G. The existence of such a low resistance indicates a welding operation is to be started and assures that a low open circuit voltage for power source 10 is held until there is a closing of the gap to initiate a welding operation. This represents the primary aspect of the present invention. In practice, the cores of transformers 60, 80 are selected to be saturated at a low level so that they do not function at higher currents as experienced during welding. Thus, they do not insert high inductance into the weld circuit when welding is actually performed. Thus, device D is operative only during periods when there is no welding being performed. This causes a need for a welding current signal in line 144 so the welder will be on after starting of a weld cycle.

Figure 5:
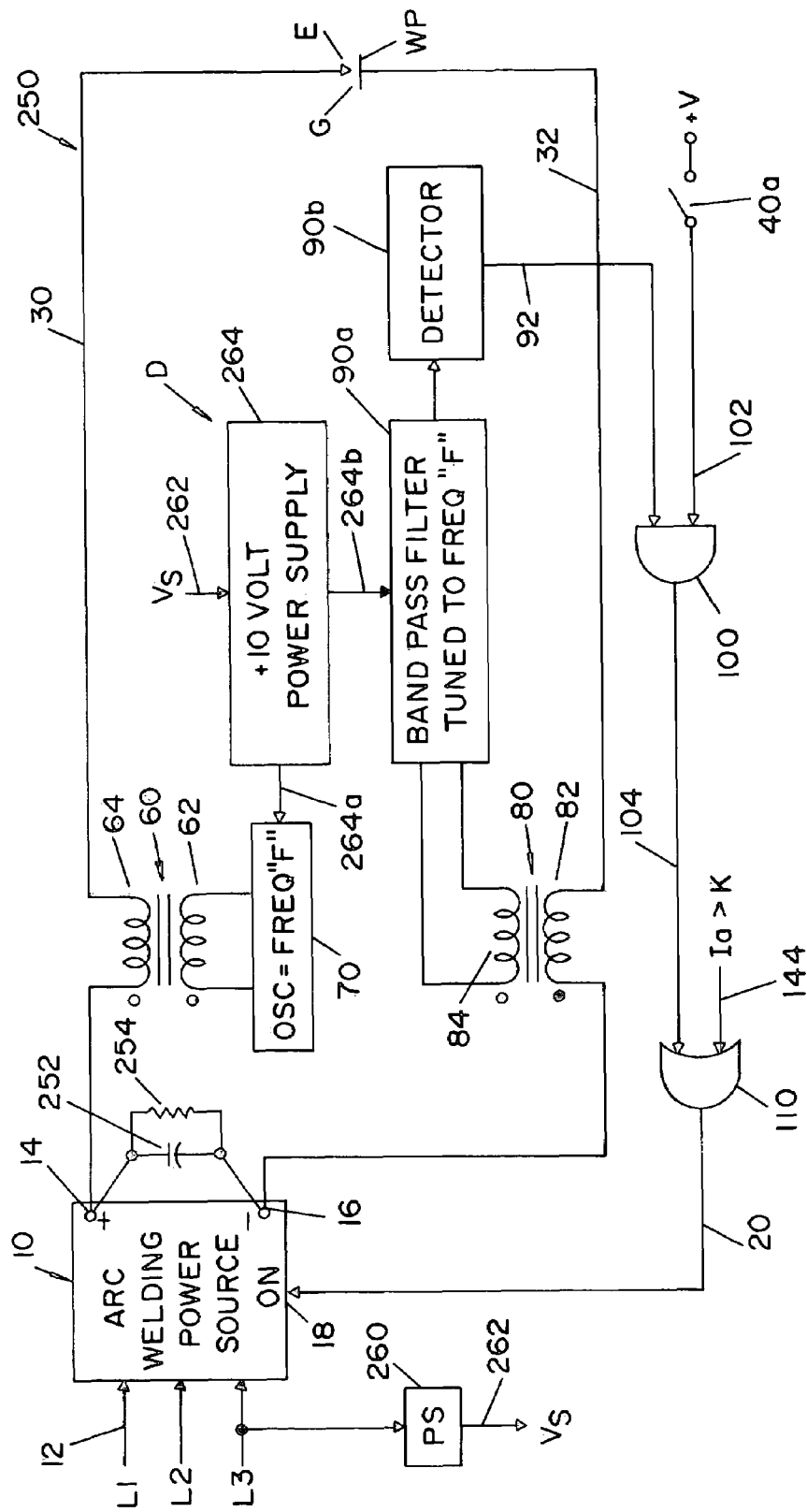
FIG. 5 is a wiring diagram of a further embodiment of the present invention.
Figure 6:
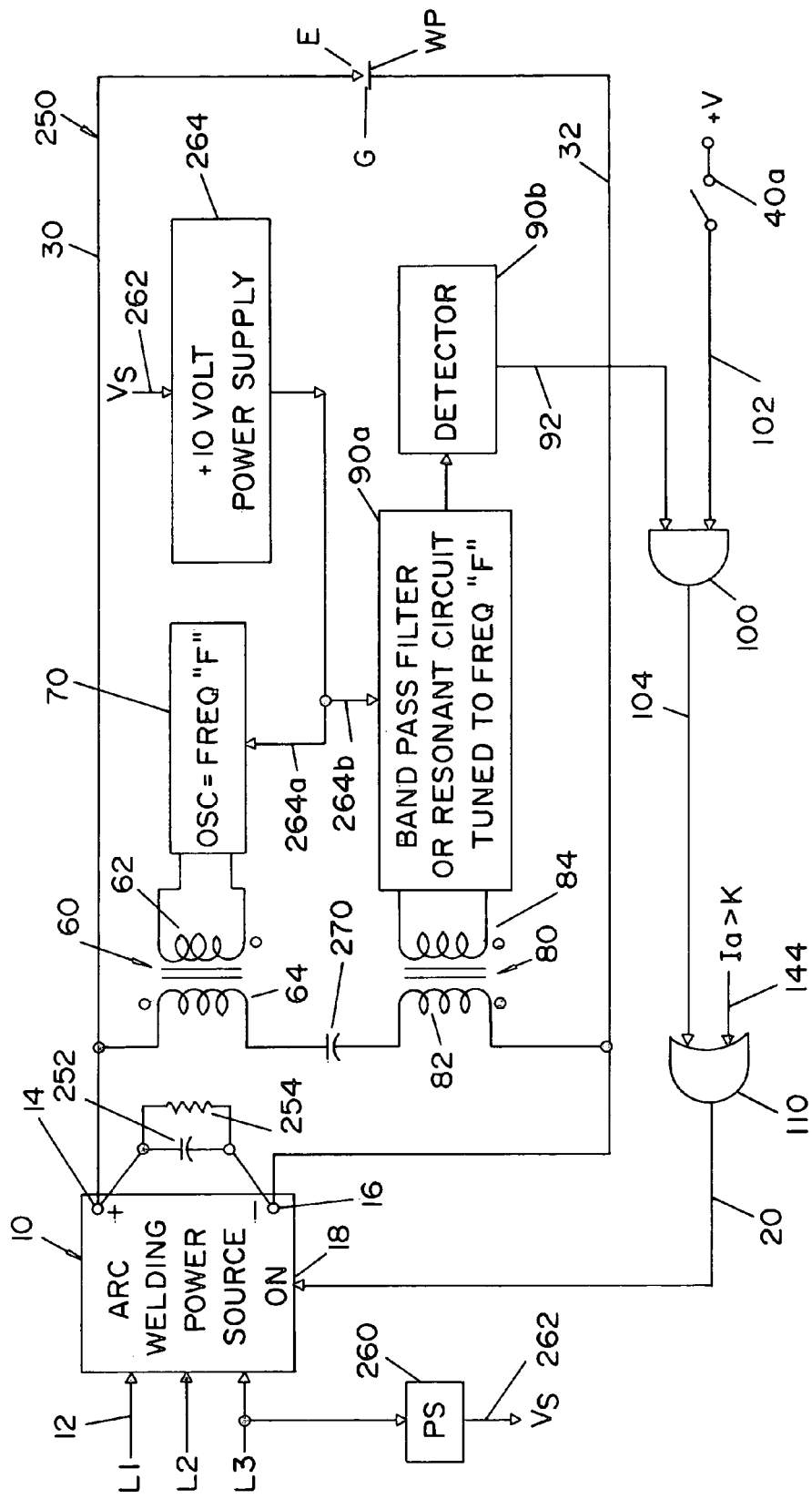
FIG. 6 is a wiring diagram of still a further embodiment of the present invention.

FIGS. 5 and 6 are schematic representations illustrating aspects of the invention and different locations available for input transformer 60 and output transformer 80. In these figures, the internal capacitance 252 and resistance 254 complete series circuit 250. Furthermore, an auxiliary power supply 260 is used to convert one phase of input 12 into a 10 volt DC signal in line 262. This signal is directed to the voltage supply 264 of the printed circuit board for device D. In this manner, there is always a voltage in line 264a, 264b to provide a signal output for operation of oscillator 70 and to operate the circuit for controlling tuned detector 90. Detector 90 is shown as being divided into a tuned pass band filter stage 90a and a detector stage 90b to provide a start signal in line 92, as previously described. A tuned filter is a tuned detector like shown in FIGS. 3, 3A and 3B which use resonant tuned circuits. These two tuned detectors are only two types of detectors usable in practicing the invention. The other components of the circuitry shown in FIGS. 5 and 6 are essentially the same as shown in FIG. 1. In FIG. 5, the signal generator of input transformer 60 is in series with the electrode and the filter and detector circuitry is tuned to the frequency of the oscillator and is in series with the work table 32. This arrangement constitutes the basic principle of the invention. A signal of given, specific frequency is generated and received by a tuned detector, which "listens" for a signal of a particular frequency. Upon receipt of such signal, the detector outputs a logic signal on line 92 if this signal exceeds a set value. Such signal is then combined with another logic signal on line 102. Both of these signals are a logic one to command the power source to be enabled. Thus, the power source is shifted from an off state to some intermediate low voltage or low power state. To receive a signal having the tuned frequency, circuit 250 must be completed. By applying a load drastically less than 200 ohms between the welding electrode and workpiece, a small current from oscillator 70 flows from the oscillator through the low resistance gap to the detector and then through the resistance/capacitance network across the power terminals 14, 16 and back to the signal generator or input transformer 60. If the resistance of gap G is less than 50 ohms, typically, enough signal current is applied to the receiver transformer 80 to enable power source 10. Both transformer 60, as the signal generator, and transformer 80, as the signal receiver, can be located on the same welding lead. Another arrangement is disclosed in FIG. 6. The transformers are coupled by capacitor 270 in series across cables 30, 32 so that the high frequency signal in series circuit 250 is accomplished through capacitor 270. The capacitor prevents low frequency current or DC current from flowing between cables 30, 32. Circuit 250 includes gap G in series in the loop being monitored by the detector of the present invention as shown in FIG. 6. The tuned detector section 90a is indicated to be either a tuned filter or a resonant circuit. These are equivalent in practicing the invention.

Figure 7:
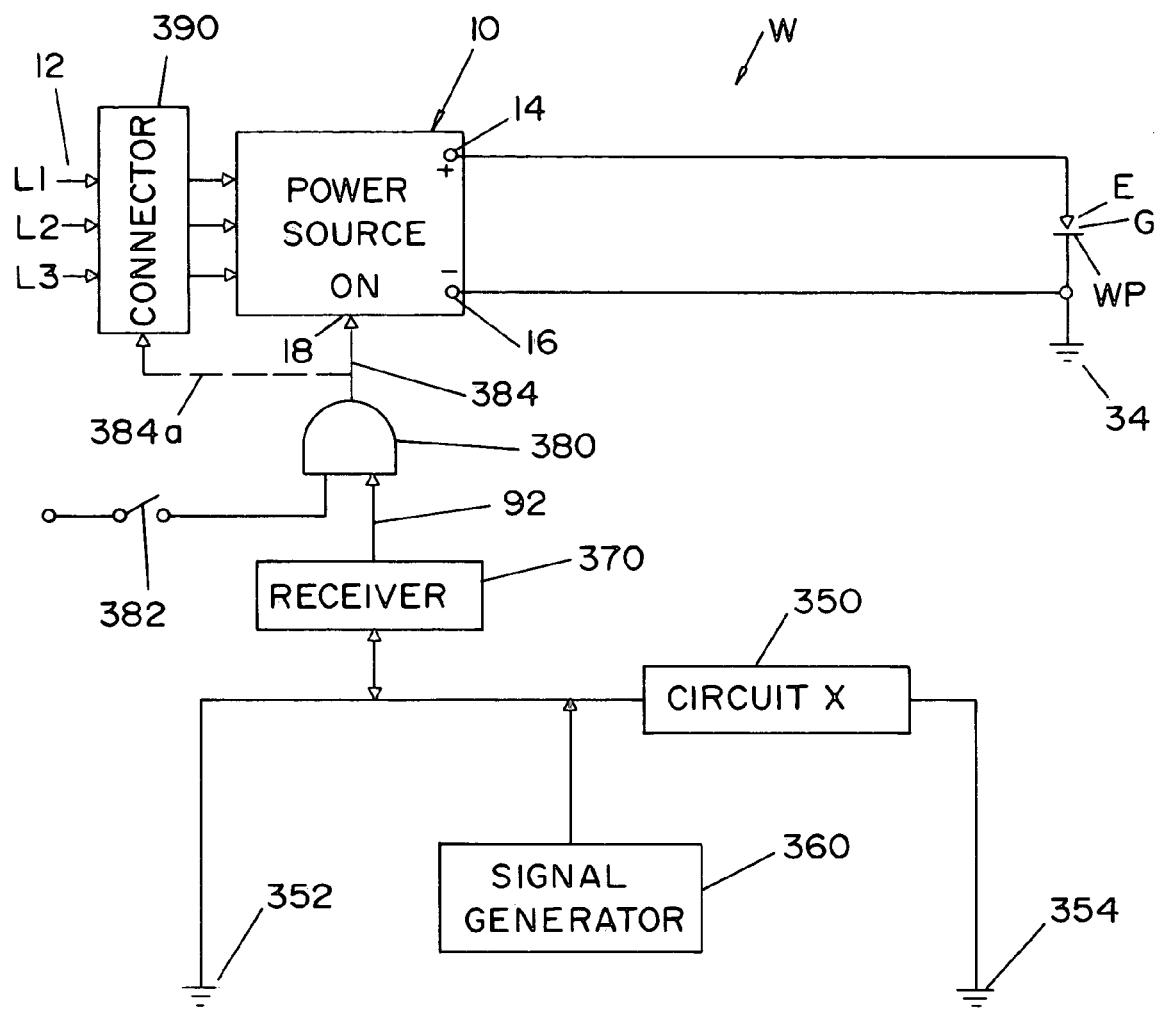
FIG. 7 is a schematic wiring diagram of a further use of the preferred embodiment of the present invention to monitor the condition of an high voltage series circuit in an electric arc welder; and, FIGS. 8–10 are pictorial views of three transformer structures to be used in the preferred embodiments of the invention.

The present invention for creating a start signal in line 92 can be used for detecting the closed or continuity condition of any high voltage circuit associated with welder W. This broad aspect of monitoring circuits experiencing high voltage when power source 10 is on is illustrated in FIG. 7. A series circuit 350 of welder W is illustrated as "Circuit X." This series circuit is subjected to the high voltage when power source 10 is on. The circuit must be closed as indicated by connection to ground terminals 352, 354 before voltage is to be provided by power source 10. To determine whether circuit X is closed, signal generator 360 creates a high frequency, low voltage signal in series circuit 350. Receiver 370 is a tuned detector, such as detector 90, to provide a signal in line 92 when the magnitude of the received signal at a given frequency exceeds a set value. This "start signal" releases gate 380 for normal operation of power source 10 when ON switch 382 is closed to create a logic one in output line 384 of anding circuit 380. Thus, if there is no start signal in line 92, power source 10 has a zero open circuit voltage and can not be operated until circuit 350 is closed. This concept can be used in any circuit of welder W which must be closed before operation of the welder at full power. There are other uses of the start signal which allows operation of the power source when a series circuit is ready for full voltage. As an alternative implementation of the invention, power source 10 has an input connector 390. Gate 380 allows power through connector 390 to power source 10 only when a start signal or power logic is created in optional line 384a. Disconnection of the input 12 is the same as preventing the power source from being turned on or operated at full power. These two techniques are both used in practicing the invention.

Structures for the transformers used in the invention are shown in FIGS. 8–10. Transformer 60 has cable 30 forming secondary winding 64 and having conductor 64a and sheath 64b. Toroidal core 400 has opening 402 and three windings 62a forming primary winding 62. The winding can be a metal tube 410 forming secondary winding 64 as shown in FIG. 9. Tubes 412, 414 are connected to welding cable 30 to form the single turn second winding. Transformer 80 has the same preferred structure. When both transformers are on the same cable, the structures are the same, but adjacent each other as shown in FIG. 10 where cable 32 forms both secondary winding 64 and primary winding 82. Device D or D' is driven by winding 62 and the received signal is detected on winding 84. Other transformer structures could be used in the invention.

The invention claimed is:

1. A device to control operation of a power source for an electric arc welder, said power source having a first output terminal connectable to a first welding cable and a second output terminal connectable to a second welding cable, where said cables are to be in a series circuit including a welding gap defined by an electrode and a workpiece, said device comprising: an oscillator driving a first winding for inducing a high frequency voltage into said series circuit, a detector tuned to said high frequency for sensing the level of current in said series circuit at said high frequency and an output circuit to create a start signal when said level exceeds a given value representing a resistance in said gap below a given amount, wherein said first winding is the primary winding of an input transformer and one of said cables is the secondary winding of said input transformer.

2. A device as defined in claim 1 wherein said detector is an output transformer with a primary winding comprising one of said cables and secondary winding in a circuit tuned to said high frequency.

3. A device as defined in claim 2 wherein said frequency is greater than 50 kHz.

4. A device as defined in claim 3 wherein said given amount is less than 100 ohms.

5. A device defined in claim 3 wherein said given value is less than 50 ohms.

6. A device as defined in claim 3 wherein said given value is less than 30 ohms.

7. A device as defined in claim 2 wherein said given amount is less than 100 ohms.

8. A device defined in claim 2 wherein said given value is less than 50 ohms.

9. A device as defined in claim 2 wherein said given value is less than 30 ohms.

10. A device as defined in claim 2 wherein said primary of said input transformer and said secondary of said output transformer are coupled by a capacitor in a circuit between said cables.

11. A device as defined in claim 1 wherein said frequency is greater than 50 kHz.

12. A device as defined in claim 11 wherein said given amount is less than 100 ohms.

13. A device as defined in claim 11 wherein said given value is less than 50 ohms.

14. A device as defined in claim 11 wherein said given value is less than 30 ohms.

15. A device defined in claim 1 wherein said given amount is lees than 100 ohms.

16. A device as defined in claim 1 wherein said given value is less than 50 ohms.

17. A device as defined in claim 1 wherein said given value is less than 30 ohms.

18. A device as defined in claim 1 wherein said input transformer has a single turn in series with one of said cables.

19. A device to control operation of a power source for an electric arc welder, said power source having a first output terminal connectable to a first welding cable and a second output terminal connectable to a second welding cable, where said cables are to be in a series circuit including a welding gap defined by an electrode and a workpiece, said device comprising: an oscillator driving a first winding for inducing a high frequency voltage into said series circuit, a detector tuned to said high frequency for sensing the level of current in said series circuit at said high frequency and an output circuit to create a start signal when said level exceeds a given value representing a resistance in said gap below a given amount, wherein said detector is an output transformer with a primary winding comprising one of said cables and secondary winding in a circuit tuned to said high frequency.

20. A device as defined in claim 19 wherein said frequency is greater than 50 kHz.

21. A device as defined in claim 20 wherein said given amount is less than 100 ohms.

22. A device defined in claim 20 wherein said given value is less than 50 ohms.

23. A device as defined in claim 20 wherein said given value is less than 30 ohms.

24. A device as defined in claim 19 wherein said given amount is less than 100 ohms.

25. A device defined in claim 19 wherein said given value is less than 50 ohms.

26. A device as defined in claim 19 wherein said given value is less than 30 ohms.

27. A device as defined in claim 19 wherein said output transformer has a single turn in series with one of said cables.

28. A device as defined in claim 19 wherein said welder has a trigger switch closed to create a trigger signal and including an anding circuit to and said trigger signal and said start signal to output a power source enabling signal.

29. A device as defied in claim 28 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

30. A device as defined in claim 29 wherein said power source starting circuit has a gate operative to start said power source upon creation of said welding circuit starting signal or said power source enabling signal.

31. A device as defined in claim 29 including a circuit to create said welding current signal only when said trigger signal has been created.

32. A device to prevent operation of a power source for an electric arc welder, said power source having a first output terminal connectable to a first welding cable and a second terminal connectable to a second welding cable, where said cables are to be in a series circuit including a welding gap defined by an electrode and a workpiece, said device comprising: an oscillator to apply a high frequency voltage at a low current to said series circuit and a detector tuned to said high frequency to create a start signal when said high frequency voltage reaches a value indicative of a resistance across said gap being below a given amount, wherein said welder has a trigger switch closed to create a trigger signal and including an anding circuit to and said trigger signal and said start signal to output a power source enabling signal.

33. A device as defined in claim 32 wherein said frequency is greater than 50 kHz.

34. A device as defined in claim 32 wherein said given amount is less than 100 ohms.

35. A device as defined in claim 32 wherein said given value is less than 50 ohms.

36. A device as defined in claim 32 wherein said given value is less than 30 ohms.

37. A device as defied in claim 32 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

38. A device as defined in claim 37 wherein said power source starting circuit has a gate operative to start said power source upon creation of said welding circuit starting signal or said power source enabling signal.

39. A device as defined in claim 37 including a circuit to create said welding current signal only when said trigger signal has been created.

40. A method of enabling the starting of the power source of an electric arc welder used to weld across the gap between an electrode and a workpiece, said method comprising:
(a) applying a high frequency voltage in a series circuit including said gap;
(b) measuring the magnitude of said high frequency voltage in said series circuit;
(c) receiving a trigger signal indicating closure of a trigger switch of said welder; and,
(d) enabling said power supply when said magnitude is greater than a level indicative of a resistance in said gap below a given amount and when said trigger signal indicates the trigger switch is closed.

41. A method as defined in claim 40 wherein said given amount is 100 ohms.

42. A method as defined in claim 40 wherein said given amount is 50 ohms.

43. A method as defined in claim 40 wherein said given amount is 30 ohms.

44. A method as defined in claim 40 wherein said high frequency is greater than 50 kHz.

45. A method as defined in claim 40 wherein said electrode is a consumable wire.

46. A method as defined in claim 40 wherein said arc welder is operated in an AC mode.

47. A method as defined in claim 40 wherein said arc welder is operated in an AC MIG mode.

48. A method as defined in claim 40 wherein said arc welder is operated in a DC mode.

49. A method as defined in claim 40 wherein said arc welder is operated in a DC MIG mode.

50. A method as defined in claim 40 wherein said high frequency voltage is at a current of less than about 50 ma.

51. A method as defined in claim 40, wherein said arc welder is operated in a TIG mode.

52. In an inverter type power source the improvement including a device to prevent operation of said power source when used for an electric arc welder, said power source having a first output terminal connectable to a first welding cable and a second terminal connectable to a second welding cable, where said cables are to be in a series circuit including a welding gap defined by an electrode and a workpiece, said device having an oscillator to apply a high frequency voltage to said series circuit and a detector tuned to said high frequency to create a start signal when said high frequency voltage reaches a value indicative of a resistance across said gap being below a given amount, wherein said welder has a trigger switch closed to create a trigger signal and including an anding circuit to and said trigger signal and said start signal to output a power source enabling signal.

53. A device as defined in claim 52 wherein said frequency is greater than 50 kHz.

54. A device as defined in claim 52 wherein said given amount is less than 100 ohms.

55. A device as defined in claim 52 wherein said given value is less than 50 ohms.

56. A device as defined in claim 52 wherein said given value is less than 30 ohms.

57. A device as defied in claim 52 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

58. A device as defined in claim 57 wherein said power source starting circuit has a gate operative to start said power source upon creation of said welding circuit starting signal or said power source enabling signal.

59. A device as defined in claim 57 including a circuit to create said welding current signal only when said trigger signal has been created.

60. A device as defined in claim 52 wherein said high frequency voltage is at a current less than about 50 ma.

61. An improvement as defined in claim 52, wherein said welder is a TIG welder.

62. A device to control operation of a power source, said device comprising: an oscillator driving a primary winding of a first transformer for inducing a high frequency voltage into a secondary winding of the first transformer connected in a series circuit associated with said power source, a detector connected to a secondary winding of a second transformer and tuned to said high frequency for sensing the level of current in a primary winding of said second transformer connected in said series circuit at said high frequency and an output circuit to create a start signal when said level exceeds a given value representing an impedance in said series circuit below a given amount.

63. A device as defined in claim 62 wherein said frequency is greater than 50 kHz.

64. A device as defined in claim 62 wherein said voltage is less than 50 volts.

65. A device as defined in claim 62 wherein said voltage is about 10 volts.

66. A device as defined in claim 62 wherein said given amount is less than 100 ohms.

67. A device as defined in claim 62 wherein said given value is less than 50 ohms.

68. A device as defined in claim 62 wherein said given value is less than 30 ohms.

69. A device as defined in claim 62 wherein said series circuit has a design impedance and said give amount is greater than said design impedance by at least 100 ohms.

70. A device as defined in claim 62 wherein said given amount is indicative of a generally open circuit for said series.

71. A device as defined in claim 62 wherein said high frequency voltage is at a current less than about 50 ma.

72. A device to control operation of a power source for an electric arc welder, said device comprising: an oscillator for inducing a high frequency voltage into a series circuit including the welding gap, a detector tuned to said high frequency for sensing the level of current in said series circuit at said high frequency and an output circuit to create a start signal when the received signal level exceeds a given value representing a resistance in said gap below a given amount, wherein said welder has a trigger switch closed to create a trigger signal and including an anding circuit to and said trigger signal and said start signal to output a power source enabling signal.

73. A device as defined in claim 72 wherein said frequency is greater than 50 kHz.

74. A device as defined in claim 72 wherein said given amount is less than 100 ohms.

75. A device as defined in claim 72 wherein said given value is less than 50 ohms.

76. A device as defined in claim 72 wherein said given value is less than 30 ohms.

77. A device as defined in claim 72 wherein said high frequency voltage is at a current less than about 50 ma.

78. A device to control operation of a power source for an electric arc welder, said device comprising: a first transformer with a secondary winding, a second transformer with a primary winding, said windings being connected in a series circuit with the output of said welder, an oscillator for exciting said secondary winding at a fixed frequency and a detector circuit tuned to said fixed frequency and driven by the signal in said primary winding to create a start signal when the resistance of said welder output is below a given amount.

79. A device as defined in claim 78 wherein said frequency is greater than 50 kHz.

80. A device as defined in claim 79 wherein said given amount is less than 100 ohms.

81. A device defined in claim 79 wherein said given value is less than 50 ohms.

82. A device defined in claim 79 wherein said given value is less than 30 ohms.

83. A device as defined in claim 79 wherein said welder has a trigger switch closed to create a trigger signal and including an anding circuit to and said trigger signal and said start signal to output a power source enabling signal.

84. A device as defied in claim 83 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

85. A device as defined in claim 84 wherein said power source starting circuit has a gate operative to start said power source upon creation of said welding circuit starting signal or said power source enabling signal.

86. A device as defined in claim 84 including a circuit to create said welding current signal only when said trigger signal has been created.

87. A device as defined in claim 78 wherein said given amount is less than 100 ohms.

88. A device as defined in claim 87 wherein said welder has a trigger switch closed to create a trigger signal and including an anding circuit to and said trigger signal and said start signal to output a power source enabling signal.

89. A device as defied in claim 88 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

90. A device as defined in claim 89 wherein said power source starting circuit has a gate operative to start said power source upon creation of said welding circuit starting signal or said power source enabling signal.

91. A device as defined in claim 89 including a circuit to create said welding current signal only when said trigger signal has been created.

92. A device as defined in claim 78 wherein said given value is less than 50 ohms.

93. A device as defined in claim 92 wherein said welder has a trigger switch closed to create a trigger signal and including an anding circuit to and said trigger signal and said start signal to output a power source enabling signal.

94. A device as defied in claim 93 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

95. A device as defined in claim 94 wherein said power source starting circuit has a gate operative to start said power source upon creation of said welding circuit starting signal or said power source enabling signal.

96. A device as defined in claim 94 including a circuit to create said welding current signal only when said trigger signal has been created.

97. A device as defined in claim 78 wherein said given value is less than 30 ohms.

98. A device as defined in claim 97 wherein said welder has a trigger switch closed to create a trigger signal and including an anding circuit to and said trigger signal and said start signal to output a power source enabling signal.

99. A device as defied in claim 98 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

100. A device as defined in claim 99 wherein said power source starting circuit has a gate operative to start said power source upon creation of said welding circuit starting signal or said power source enabling signal.

101. A device as defined in claim 99 including a circuit to create said welding current signal only when said trigger signal has been created.

102. A device as defined in claim 78 wherein said welder has a trigger switch closed to create a trigger signal and including an anding circuit to and said trigger signal and said start signal to output a power source enabling signal.

103. A device as defied in claim 102 wherein said welder includes a current measuring device for measuring the welding current in said series circuit and a comparator to create a welding current signal when said measured welding current exceeds a given welding current and a power source starting circuit to create a starting signal to start said power source upon creation of said welding current signal.

104. A device as defined in claim 103 wherein said power source starting circuit has a gate operative to start said power source upon creation of said welding circuit starting signal or said power source enabling signal.

105. A device as defined in claim 103 including a circuit to create said welding current signal only when said trigger signal has been created.

* * * * *